Patented Apr. 13, 1954

2,675,362

UNITED STATES PATENT OFFICE 2,675,362

PROCESS FOR THE POLYMERIZATION OF STYRENE

Tevis Shusman, Longmeadow, Mass., assignor to Monsanto Chemical Company, St. Louis, Mo., a corporation of Delaware No Drawing. Application January 12, 1952, Serial No. 266,250

6 Claims. (Cl. 260—23)

This invention relates to a process for preparing polystyrene. More particularly, the invention relates to a mass polymerization process which produces a polystyrene molding powder having unexpected molding properties.

Styrene may be polymerized by mass or bulk polymerization processes to produce polymers which vary from soft low-molecular-weight materials to extremely hard high-molecular-weight materials. For molding powders, an intermediate molecular weight range of from about 40,000 to about 100,000 (calculated by the Stuadinger equation) is desirable.

The molecular weight of the mass polymers may be regulated by (1) controlling the amount of catalyst, (2) by controlling the reaction temperature, (3) by adding a shortstop, or by a combination of all three. However, even under the best conditions, the polymer generally contains from 2 to 5% by weight of unreacted monomer. The unreacted monomer must be removed and this may be accomplished by mechanical malaxation or other means, all of which add to the cost of preparing a usable molding powder.

One object of this invention is to provide a new process for preparing polystyrene by mass polymerization.

A further object is to provide a process for mass polymerization of styrene to obtain a polymer containing a minimum amount of residual unreacted monomer.

Another object is to provide a mass process for polymerizing styrene to produce a polymer having improved physical and molding properties.

These and other objects are attained by polymerizing styrene in a specific temperature-time cycle in the presence of a saturated aliphatic acid containing from 12 to 20 carbon atoms, with or without a peroxy catalyst and under substantially anhydrous conditions.

The following examples are given in illustration and are not intended as limitations on the process of this invention. Where parts are mentioned, they are parts by weight.

Example I

Dissolve 0.02 part of di(tertiary butyl) peroxide in 100 parts of substantially anhydrous styrene. Heat the styrene at about 90° C. until about 28% conversion to polystyrene is obtained. Then raise the temperature gradually to 185° C. over a period of about 4.5 hours and continue heating at 185° C. for a final 3.5 hours. The polymer obtained molds easily in the standard injection molding cycle but the articles produced have black streaks in them and craze quickly when exposed to sunlight. Furthermore, the injection molding dies soon pick up an oily coat which is transferred unevenly to the molded articles causing surface defects. The polymer contains about 2% residual monomer. It has a molecular weight of about 70,000.

Example II

Dissolve 0.02 part of di(tertiary butyl) peroxide and 0.1 part of stearic acid in 100 parts of styrene. Heat the styrene at about 90° C. until about 28% conversion to polymer is obtained. Raise the temperature gradually to 185° C. over a period of about 4.5 hours and continue the heating at 185° C. for about 3.5 hours. The polymer obtained has a residual monomer content of from 0.35 to 0.5%. During the injection molding of this polymer, the standard time cycle is unnecessarily long. It can be considerably shortened, making it possible to prepare more molded articles per unit of machine time. The articles produced have no visible defects and there is substantially no die pickup. In addition, the heat distortion temperature is substantially higher and the brilliance of the molded articles is substantially greater than is the case for articles molded from the polymer made according to Example I.

Example III

Repeat Example II except increase the amount of stearic acid to 0.25 part. The polymer produced has a slightly lower heat distortion temperature and even greater brilliance than that of Example II. The molecular weight of the polymers of both Example II and Example III is about 70,000.

Example IV

Repeat Example II except use 0.4 part of stearic acid and 0.01 part of di(tertiary butyl) peroxide. The polymer obtained is substantially the same as that obtained in Example II.

Example V

Repeat Example II leaving out the peroxide and using 0.5 part of stearic acid. The polymer obtained is substantially the same as that obtained in Example II.

The examples are confined to the use of stearic acid because it alone gives the unexpected and greatly to be desired increase in brilliancy of the molded articles. Other aliphatic saturated acids containing from 12 to 20 carbon atoms operate to reduce the residual monomer in the polymer under the conditions of this reaction. Among such acids are lauric, tridecanoic, myristic, pentadecanoic, palmitic, margaric, stearic, nonadecanoic, and arachidic acids. Of these acids, those containing from 12 to 17 carbon atoms do not produce the increase in heat distortion temperature that stearic acid does and the acids containing 19 to 20 carbon atoms do not produce a polymer which can be molded in a shorter molding cycle. However, all of these acids reduce the residual monomer content of the polymer when used in an amount of about 0.1 part per 100 parts of styrene monomer. At this concentration, a small amount of a peroxy catalyst is necessary to obtain complete polymerization in a reasonable time. The amount of acid may be increased to about 0.6 part per 100 parts of monomer. The increase does not substantially effect the residual monomer content but does make it possible to reduce the amount of peroxy catalyst and even to eliminate the peroxy catalyst at from 0.5 to 0.6 part of acid.

The action of the acids is strange and, so far, unexplainable. They apparently act as catalysts since they may be used without peroxy compounds but they do not produce polymers of varying molecular weights as the amount of acid is varied. Furthermore, the amount of residual monomer reaches a minimum of from 0.35 to 0.5% and no further addition of acid or peroxy compound has any substantial effect.

Even more unexpected is the increase in brilliance of the molded articles when stearic acid is used. The difference in brilliance is difficult to measure quantitatively but it is readily apparent even to the untutored eye. The increased brilliance is an important consideration for sales appeal and is particularly valuble for the preparation of light reflectors, lenses, light-conducting rods, etc.

A peroxy compound should be employed in the process of this invention if the lower range of acid is used. In general, the amount of peroxy compound may range from 0.03 part by weight for 0.1 part of acid to no peroxy compound for 0.5 to 0.6 part of acid, all parts being based on 100 parts of monomer. Furthermore, not all peroxy compounds may be used. The effective peroxy compounds are such dialkyl peroxides, alkyl perbenzoates and the alkyl peracetates as are completely soluble in styrene. Those peroxy compounds in which the alkyl groups are tertiary butyl groups are especially useful since they have relatively high solubility in styrene and the tertiary butyl residue in the polymer appears to be less detrimental to the physical properties of the polymer than other alkyl residues.

The use of the acids alone or in conjunction with the peroxy compounds does not produce the desired polymers unless a relatively specific polymerization cycle is used. The cycle consists of three steps. The first step in the cycle is heating the monomer at 85-95° C. until from 25 to 30% conversion of the monomer to polymer has occurred. This may easily be measured by a continuous recording viscometer operating in conjunction with the reaction vessel. The duration of the first step is from 18 to 24 hours.

The second step involves a gradual rise in temperature to from 170° C. to 190° C. The rise in temperature should be regulated to take from 4 to 5 hours.

The final step is a finishing step. It is carried out at 170-190° C. for from 3 to 5 hours. At the end of this step, the process is complete and the polymer is ready for any mechanical action necessary to change its form to a size and shape convenient for use in injection or compression molding processes or for extrusion.

The process of this invention makes it possible to obtain a polymer having low residual monomer and improved physical and molding properties.

It is obvious that variations may be made in the processes and products of this invention without departing from the spirit and scope thereof as defined by the appended claims.

What is claimed is:

1. A process for the mass polymerization of styrene which comprises dissolving from 0.03 to 0 part of a peroxy compound and correspondingly from 0.1 to 0.6 part of a saturated aliphatic acid containing from 12 to 20 carbon atoms in 100 parts of styrene monomer, heating the monomer at 85-95° C. until 25-30% conversion to polymer is obtained, then raising the temperature gradually to 170-190° C. over a period of 4 to 5 hours and finally heating the reaction at 170-190° C. for from 3 to 5 hours, said peroxy compound being taken from the group consisting of dialkyl peroxides, alkyl perbenzoates and alkyl peracetates.

2. A process as in claim 1 wherein the acid is stearic acid.

3. A process as in claim 1 wherein the alkyl group of the peroxy compound is a tertiary butyl group.

4. A process as in claim 1 wherein the acid is stearic acid and the peroxy compound is di(tertiary buytl) peroxide.

5. A process for the mass polymerization of styrene which comprises dissolving 0.02 part of di(tertiary butyl) peroxide and 0.1 part of stearic acid in 100 parts of styrene monomer, heating the monomer at about 90° C. until about 28% conversion to polymer is obtained, then raising the temperature gradually to about 185° C. over a period of 4.5 hours and finally heating the reaction at about 185° C. for 3.5 hours.

6. A process for the mass polymerization of styrene which comprises dissolving 0.5 part of stearic acid in 100 parts of styrene monomer, heating the monomer at about 90° C. until about 28% conversion to polymer is obtained, then raising the temperature gradually to about 185° C. over a period of 4.5 hours and finally heating the reaction at about 185° C. for 3.5 hours.

References Cited in the file of this patent

UNITED STATES PATENTS

| Number | Name | Date |
| --- | --- | --- |
| 2,298,271 | Auer | Oct. 13, 1942 |
| 2,403,962 | Auer | July 16, 1946 |
| 2,456,558 | Glick | Dec. 14, 1948 |